United States Patent [19]
Melvin

[11] Patent Number: 4,742,241
[45] Date of Patent: May 3, 1988

[54] WAVE ENERGY ENGINE

[76] Inventor: Kenneth P. Melvin, 934 Park St., Alameda, Calif. 94501

[21] Appl. No.: 846,952

[22] Filed: Apr. 1, 1986

[51] Int. Cl.⁴ .............................................. F03B 13/12
[52] U.S. Cl. ....................................... 290/53; 290/42; 417/332; 60/495
[58] Field of Search ......................... 290/42, 53, 43, 54; 60/495, 497, 498, 500, 501, 505, 506; 417/61, 100, 330–332, 337, 521, 525; 416/84, 85; 415/7

[56] References Cited

U.S. PATENT DOCUMENTS

| | | | |
|---|---|---|---|
| 3,569,725 | 3/1971 | Rosenberg | 290/53 |
| 3,758,788 | 9/1973 | Richeson | 60/500 X |
| 4,098,084 | 7/1978 | Cockerell | 417/332 X |
| 4,163,633 | 8/1979 | Vriend | 60/506 X |
| 4,174,192 | 11/1979 | Daddario | 417/333 |
| 4,210,821 | 7/1980 | Cockerell | 290/54 X |
| 4,313,716 | 2/1982 | Jones | 60/500 X |
| 4,340,821 | 7/1982 | Slonim | 60/495 X |
| 4,454,429 | 6/1984 | Buonome | 60/495 X |
| 4,560,884 | 12/1985 | Whittecar | 290/53 X |
| 4,622,473 | 11/1986 | Curry | 290/53 |

Primary Examiner—William M. Shoop, Jr.
Assistant Examiner—Sharon D. Logan
Attorney, Agent, or Firm—Harris Zimmerman; Howard Cohen

[57] ABSTRACT

An apparatus for capturing a portion of the wave energy on the surface of a body of water and converting the captured energy to a usable form of power incudes a large array of flotation devices, each connected to one of a plurality of energy conversion devices such as piston pumps. The conversion devices are all secured to a common frame structure which is supported by the buoyancy of the flotation devices. The apparatus floats with a draft which is a function of the average wave height in the area covered by the array. The lateral dimensions of the apparatus are greater than the expected wavelength to maintain a generally horizontal disposition. The apparatus may be moored at virtually any marine location, and the energy produced is transferred to storage facilities by a submerged conduit. The moorings may include winching means to submerge the apparatus during storms and high seas. A plurality of such apparatus may be disposed to form a breakwater to protect a harbor, beach, or the like.

16 Claims, 6 Drawing Sheets

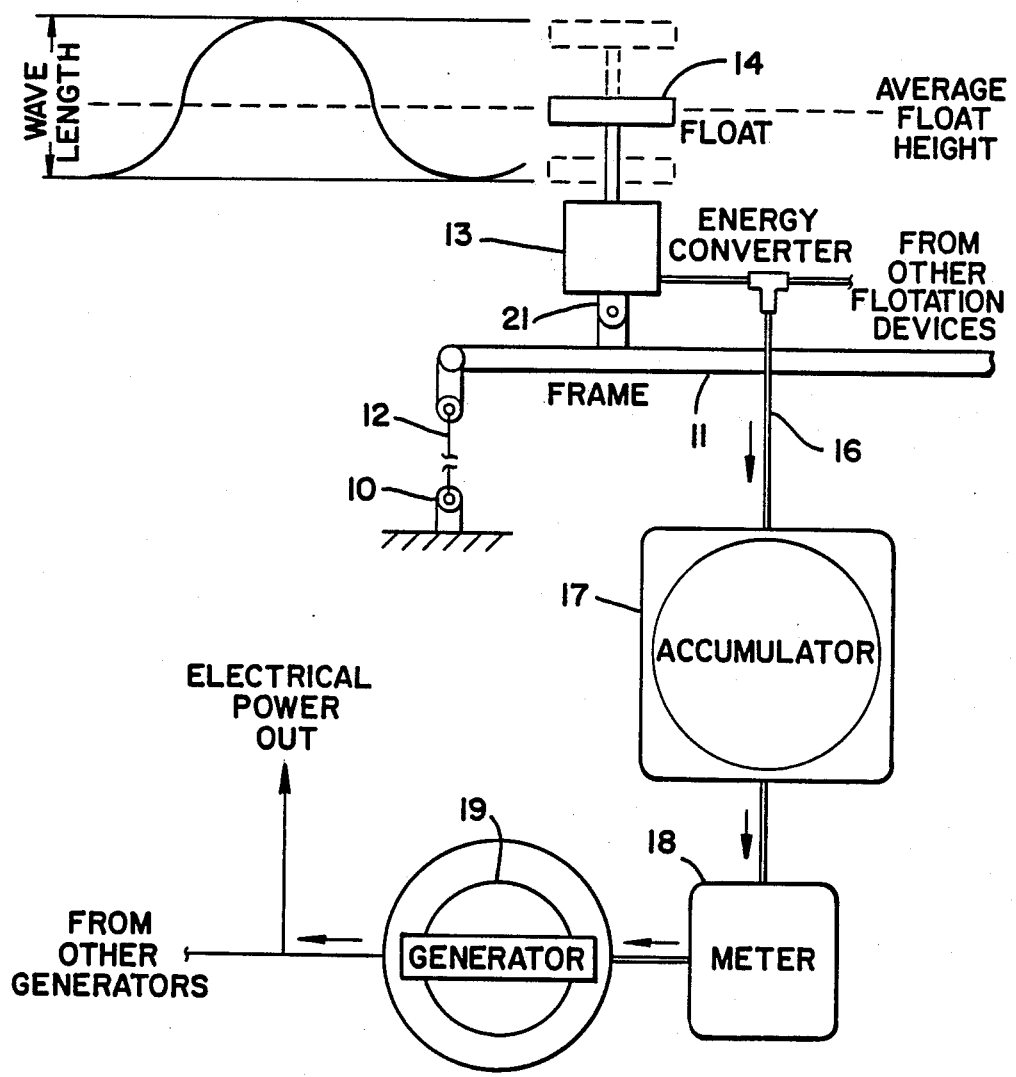
FIG _ 1

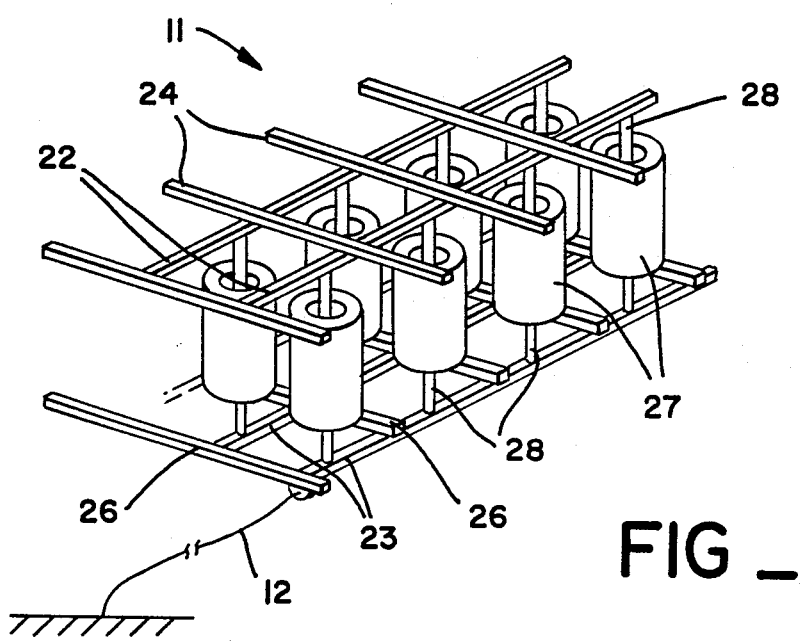
FIG_2
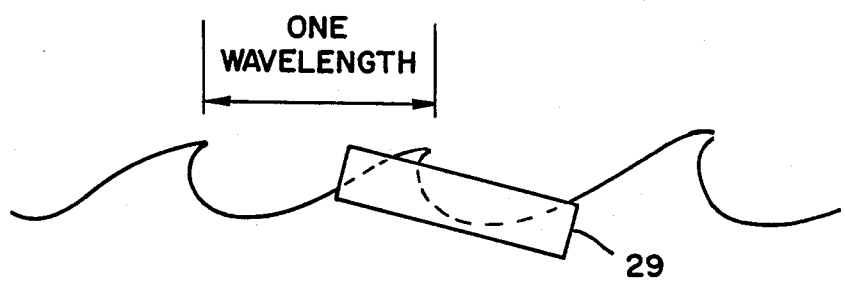
FIG_3
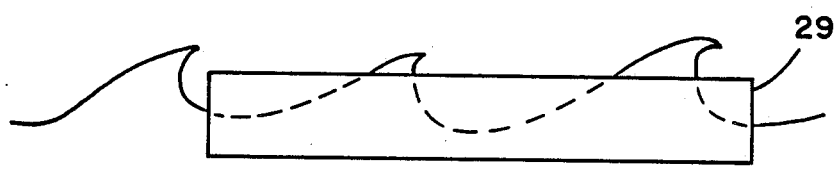
FIG_4
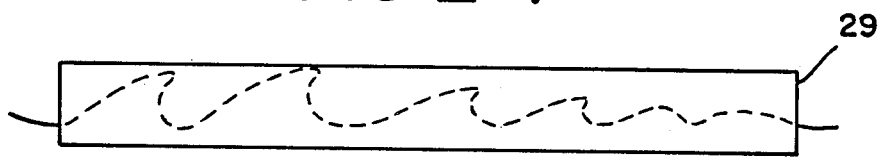
FIG_5

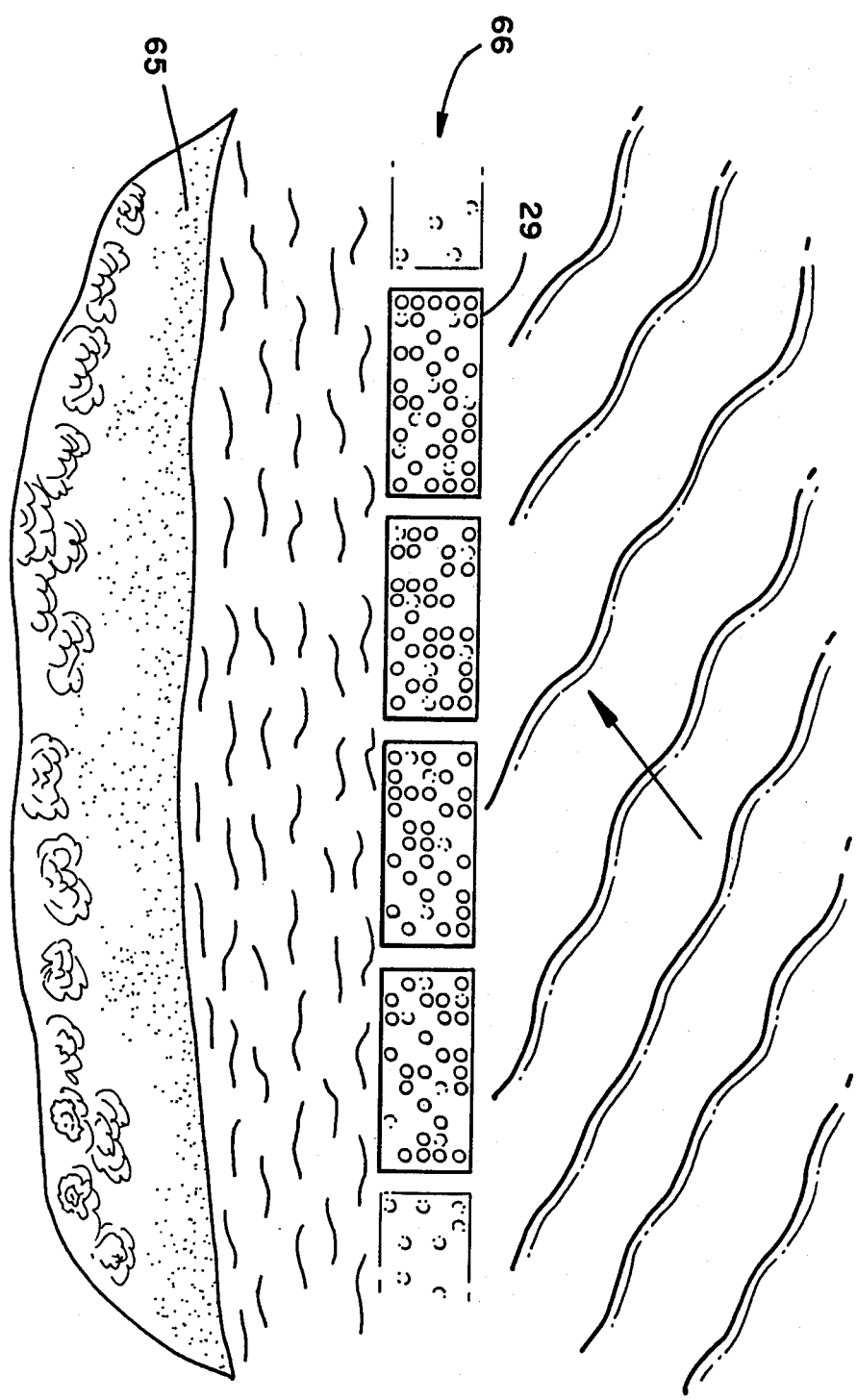

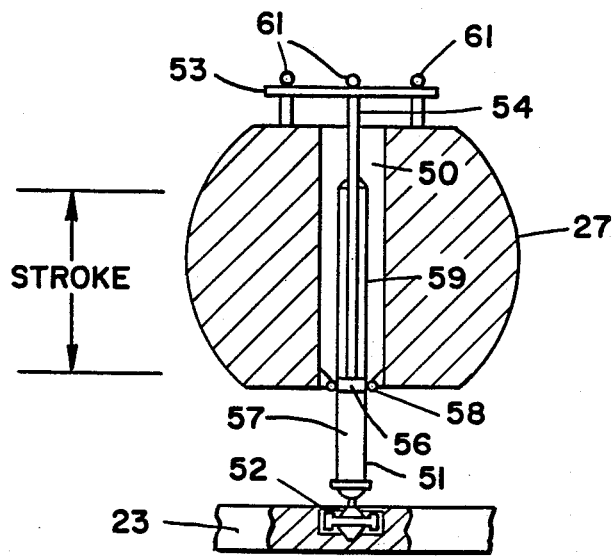
FIG _ 7
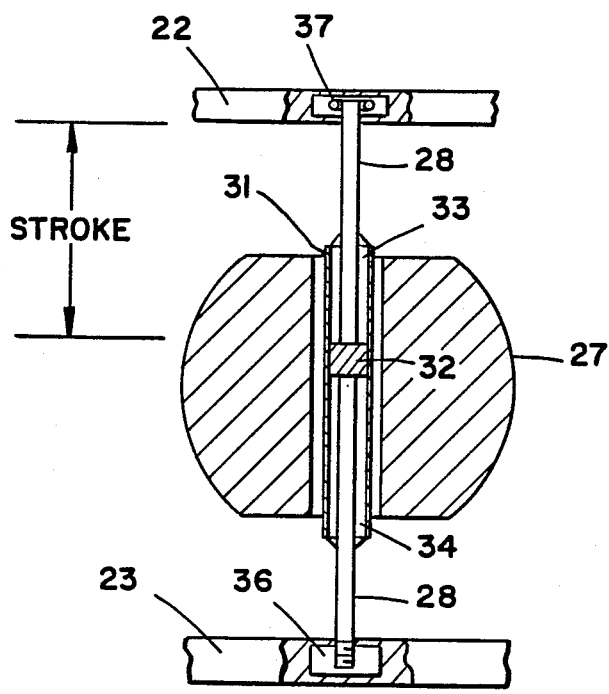
FIG _ 8

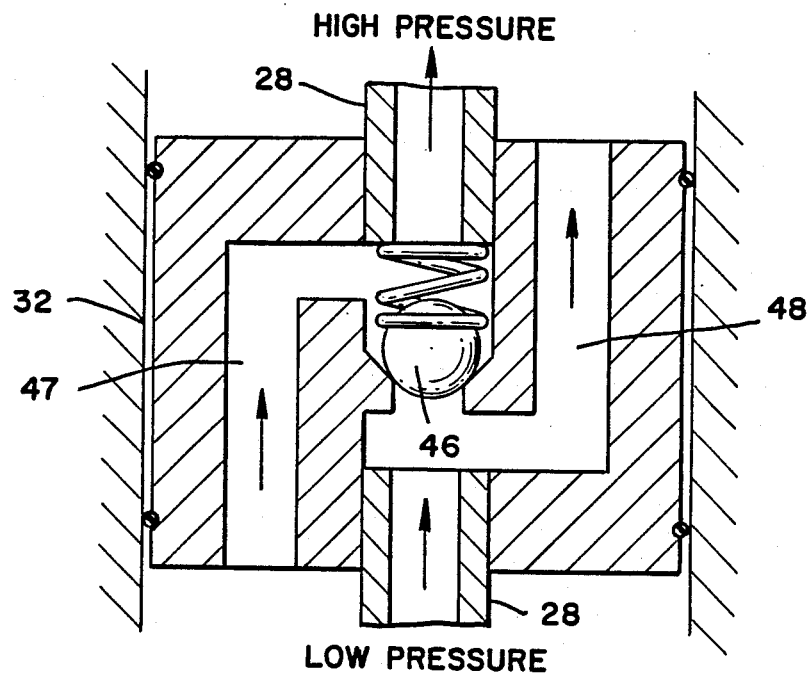
FIG _ 9
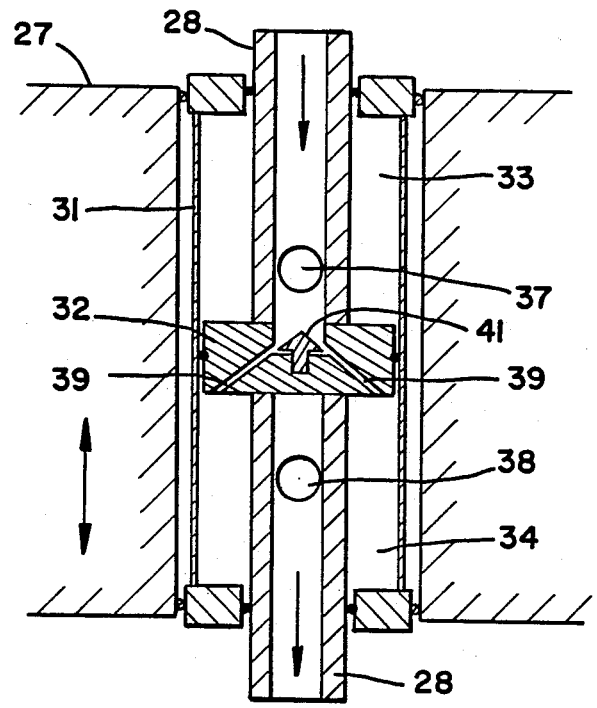
FIG _ 10

COMMON DOUBLE ACTING CYLINDER

DOUBLE ROD END

CYLINDER WITH INTERNAL CHECK

DOUBLE ROD END WITH INTERNAL CHECK

WAVE ENERGY ENGINE

BACKGROUND OF THE INVENTION

The wave action on a large body of water has always attracted man's attention, perhaps because of the incessant nature of the waves. As waves strike land, the pounding surf is a reminder of the enormous energy which is carried in the wave motion of the water. Since the time of the ancient Greeks, men have observed and felt that energy, and have tried to devise an effective apparatus to harness this seemingly tireless source of power.

A major stumbling block in utilizing wave energy as a power source is the fickle nature of waves in general: The tidal flow continually changes the average height of the sea, and wave height and length constantly change to add to the variation. High winds and storms appear occasionally, and their destructive forces exerted on any large mechanical structure are difficult to withstand for any length of time. Also, the marine environment itself, including the salt water, the salt air, blowing sand from beach areas, is extremely hostile to mechanical components.

The prior art in wave energy recovery machines is exemplified by U.S. Pat. Nos. 3,683,884 and 4,454,429. The former uses a floating pipeline to support floats which pump a fluid through several pumps in series, while the latter employs a fixed installation in which wave action operates a float on a lever arm, and the arm operates a piston pump. Both devices lack means for compensating for changes in wave length and direction of wave propagation, and thus could not form the basis for a realistic wave energy engine.

SUMMARY OF THE PRESENT INVENTION

The invention includes a large array of flotation devices, each connected to one of a plurality of energy conversion devices such as piston pumps. The conversion devices are all secured to a partly submerged, common frame structure, which is supported by the buoyancy of the flotation devices.

The frame structure is disposed to float at a depth which is a function of the average wave height in the area covered by the array, so that surface waves propagating through the frame structure in any direction will continually raise and lower the flotation devices with respect to the draft level determined by the average wave height. Thus the common frame permits the apparatus to "track" the constantly changing sea level, and maximize the extraction of energy from the surface waves.

The apparatus may be moored at virtually any marine location, and the energy produced is transferred to storage facilities by a submerged conduit. The moorings may includes winches or the like to submerge the entire apparatus during periods of high seas or severe storms. In addition, a plurality of apparatus according to the present invention may be disposed in adjacent, serial fashion to form a breakwater. Thus the invention may serve the dual function of converting wave energy to useful work, and at the same time attenuating the wave energy to protect shoreline, harbors, or other installations.

BRIEF DESCRIPTION OF THE DRAWING

FIG. 1 is a functional block diagram of the wave energy apparatus of the present invention.

FIG. 2 is a perspective view of one embodiment of the wave energy apparatus of the present invention.

FIG. 3 is a graphic representation of the relationship between sea wave length and size of the apparatus of the present invention.

FIG. 4 is a graphic representation of the relationship between sea wave length and greater size of the apparatus of the present invention.

FIG. 5 is a graphic representation of the attenuation of surface wave energy by the apparatus of the present invention.

FIG. 6 is a plan view of a breakwater installation formed by the apparatus of the present invention.

FIG. 7 is a cross-sectional representation of one form of pumping device and flotation device according to the present invention.

FIG. 8 is cross-sectional representation of a further embodiment of a pumping device and flotation device assembly according to the present invention.

FIG. 9 is an enlarged cross-sectional detail, showing one embodiment of an internal check valve for the pumping device of the present invention.

FIG. 10 is an enlarged cross-sectional detail, showing another embodiment of an internal check valve and piston assembly for the pumping device of the present invention.

DESCRIPTION OF THE PREFERRED EMBODIMENT

Figure 11A:
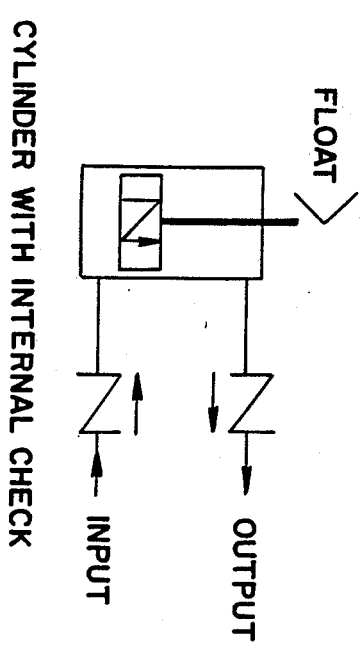
FIGS. 11a–11d are a sequence of schematic piping diagrams depicting the valve arrangements for the various pumping devices described herein.

The present invention generally comprises an apparatus for capturing a portion of the wave energy on the surface of a body of water and converting the captured energy to a usable form of power. With regard to FIG. 1, the apparatus includes a plurality of flotation devices 14 disposed in a large, generally planar array of regular or irregular arrangement, as described below. Each flotation device 14 is joined to the operating member of an energy conversion device 13. The device 13 may comprise a fluid pump or the like, or may comprise other categories of energy converters, such as turbine pumps, rotary electrical generators, piezoelectric generators, etc.

The energy conversion devices 13 are generally disposed in the same large array as the flotation devices 14. The conversion devices 13 are all secured to a partly submerged, common frame structure 11. It is significant to note that the frame structure is buoyantly supported by the buoyancy of the flotation devices acting through the energy conversion devices.

The frame structure 11 is disposed to float at anchor at a depth which is a function of the average wave height in the area covered by the array. Surface waves propagating through the frame structure 11 in any direction will continually raise and lower the individual flotation devices 14 with respect to the draft level determined by the average wave height and the net buoyancy of all the flotation devices 14 acting together on the frame structure. Thus the common frame permits the apparatus to "track" the constantly changing sea level, and maximize the extraction of energy from the surface waves. Also, wave propagation in any direction is equally effective in raising and lowering the plurality of flotation devices, so that any virtually any wave energy can be converted to useful energy.

The weight and mass distribution of the apparatus is arranged so that the neutral buoyancy state is maintained with the structural frame 11 disposed generally parallel to the surface at a generally constant average depth. This feature acts to overcome and mitigate large variations in sea surface level, such as tidal variations, large swells, and the like, by riding at the average surface level.

The output of the device 13 is fed through a conduit 16 to an accumulator 17. In the case of a fluid pump, the accumulator may comprise a pressurized tank, a pumped storage holding pool, a hydropneumatic bladder, or the like. The accumulated energy may be converted to usable form, for example, by driving a generator 19 through a metering and control system 18. The electrical power output may be combined with that of other generators 19 and delivered to a consumer or a distribution network. Hydraulic motors coupled to electrical generators are known in the prior art, and form no independent part of the present invention.

With regard to FIG. 2, one embodiment of the frame structure 11 includes upper support members 22 and 24 joined in orthogonal relationship to form an upper grid structure. Lower support members 23 and 26, also joined in orthogonal relationship, define a lower grid structure parallel to the upper grid and rigidly secured thereto by cross-bracing and the like, which is not shown in the figure. A plurality of hollow tubular shafts 28 are secured fixedly between the upper and lower grid structures, in this case secured between the parallel upper and lower members 22 and 23, respectively. A like plurality of flotation devices, here comprising cylindrical floats 27, are each secured about one of the shafts 28, and disposed to translate axially along the respective shaft 28. This translation is caused by the buoyancy of the floats interacting with the surface waves passing through the open framework of the structure 11. The coupling of the floats 27 to the energy conversion devices is described below. It should be noted that the concentric arrangement of the floats about the shafts prevents any significant lateral displacement of the floats by the surface waves.

The structure 11 is anchored to the sea floor by an anchor line 12, with sufficient slack line to permit the structure to float at anchor. The frame structure 11 may be configured in any desirable planar geometrical shape. One possible configuration is the rectangular array 29 depicted, for example, in FIG. 6. The layout should be optimized so that the surface wave energy has access to the maximum number of floats 27 as it passes through the structure.

It may be noted that the floats 27 may be configured as cylinders, spheroids, or any other desired geometrical shape. Smooth contours of the floats tend to minimize fluid drag as the floats rise and fall in the passing waves, and thereby maximize the vertical translation of the floats which produces useful energy.

As shown in FIG. 8, one arrangement for coupling the flotation device to the energy conversion device includes the float 27 secured concentrically about the hollow tubular shaft 28. In this embodiment the shaft 28 is connected between a low fluid pressure input header and a high fluid pressure output header. These headers may be secured in, or integrally formed in the structural framework members 22 and 23. The float 27 is joined to a cylinder 31 disposed concentrically about the shaft and disposed to translate axially therealong. The cylinder 31 is sealed at both ends to the shaft 28. The shaft 28 includes a cylindrical block 32 disposed medially therealong and provided with a sliding fluid seal. The block 32 divides the annular space between the shaft 28 and the inner wall of the cylinder 31 into upper and lower chambers 33 and 34, respectively. These chambers change in volume according to the height of the cylinder and float assembly, and define the pumping mechanism of this embodiment.

It should be noted that the lower end of the shaft 28 is threaded into a socket 36 in the lower structural member 23, and the upper end of the shaft is joined by a removable clamp 37 to the upper member 22. This arrangement facilitates the removal and replacement of the entire float-cylinder-shaft assembly from above by releasing the clamp 37 and unthreading the lower end of the shaft. Appropriate check values, described below, may be incorporated in the socket 36 and the clamp assembly 37 to permit the removal and replacement of the assembly while the remainder of the system continues to operate.

The pumping arrangement of FIG. 8 may be provided with an internal check valve assembly, as shown in FIG. 10 in detail. The shaft 28 includes a port 37 communicating between the interior of the shaft and the upper chamber 33, and another port 38 communicating between the interior of the shaft and the lower chamber 34. The cylindrical block 32 is provided with a plurality of converging flow channels 39 extending therethrough from the lower chamber 34 to the inner flow space of the shaft 28 above the block 32. A valve member 41 is seated at the convergence point of the flow channels 39, and is spring biased to block fluid flow upwardly, and to permit fluid flow downwardly from the shaft interior to the chamber 34.

It may be appreciated that as the float 27 is lifted by a passing surface wave, the cylinder 31 is driven upwardly, and the volume of the chamber 34 is diminished. The fluid occupying the chamber 34 experiences an increase in pressure, due to decreasing volume. The valve member 41 blocks upward flow; the only outlet for the pressurized fluid is through the port 38 and downwardly through the shaft 28. At the same time, the upper chamber 33 is increasing in volume, and drawing in fluid from the upper end of the shaft 28 through the port 37.

After the passage of a wave, the weight of the float assembly causes it to translate downwardly. The filled upper chamber becomes pressurized, and this pressurized fluid flows through port 37 and flow passages 39 to the lower chamber. This low pressure flow thus fills the lower chamber 34 for the next high pressure pumping sequence. It may be noted that the upper end of the shaft 28 is connected to a low pressure fluid supply, and the lower end of the shaft 28 is connected to a high pressure output manifold. This supply and manifold arrangement may be incorporated into the structural members which support the ends of the shaft 28. Furthermore, as shown in FIG. 11d, check valves external to the float-cylinder assembly are coupled to the input and output ends of each shaft 28 to prevent backflow conditions from occurring. It should also be noted that an external check value may be substituted for the valve member 41, as depicted schematically in FIG. 11b, so that fluid flow can occur only from the input end to output end.

A further embodiment of the internal check valve, shown in FIG. 9, is also incorporated into the cylindrical block 32. It includes a ball check valve 46 oriented so that a high pressurize fluid output is conducted upwardly in the shaft 28 and blocked from downward flow. A port 47 connects the high pressure side of the cylinder with the high pressure output, and a port 48 connects the low pressure inlet of shaft 28 with the low pressure side of the cylinder.

Another embodiment of the float-pumping device assembly of the present invention, shown in FIG. 7, includes a float 27 having a bore 50 extending axially therethrough. The bore is adapted to receive a cylinder 51 therethrough with clearance for relative axial translation, and guides 58 extend from the lower end of the bore to maintain this clearance. The cylinder is secured in the lower structural member 23 by a pivoting socket device 52. A plate 53 is joined to the upper end of the float 27 and disposed parallel thereto. Depending from the plate 53 is a piston rod 54, which extends into the cylinder 51 and is joined at its lower end to a piston 58. The upper end of the cylinder is sealed about the piston rod. The assembly of the float, piston rod, and piston translate axially, and define opposed chambers 57 and 59 of a common double acting cylinder pump.

It may be noted that the plate 53 at the upper end of the float is provided with tether connections 61. These eyes or cleats are adapted to connect the upper portion of the float cylinder assembly to the upper structural members 22 and 24 with a small degree of lateral freedom or play. Due to the pivotal mounting of the lower end of the cylinder, the entire float-pump assembly may pivot horizontally in any direction to absorb the lateral component of surface wave energy without damage.

Figure 11B:
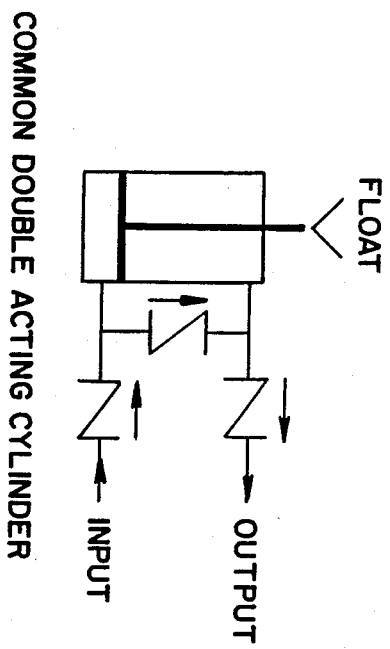
Figure 11C:
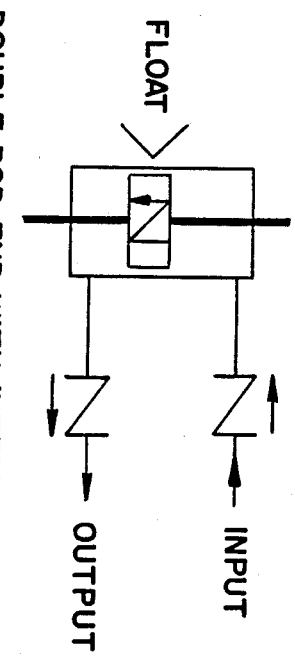
Figure 11D:
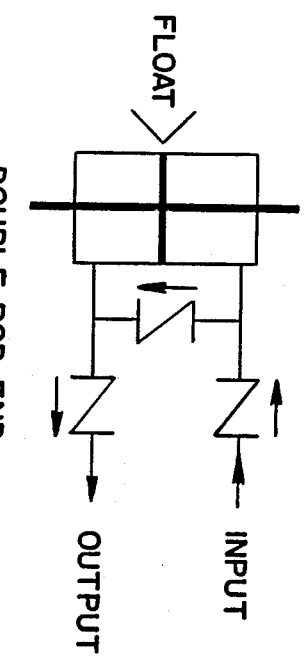

The check valve arrangement for the embodiment of FIG. 7, depicted in FIG. 11a, includes check valves on the input and output legs, as well as an external or internal check valve therebetween directed to the output leg. The connections to the chambers 57 and 59, not shown in FIG. 7, permit the intake of low pressure fluid and the output of high pressure fluid.

In this or previous embodiments, the outputs of the plurality of pumping cylinders may be coupled in common to an output header to achieve a moderate pressure output. Alternatively, the pumping cylinders may be ganged in series, so that the output of one forms the input of the next. This arrangement results in a very high pressure output, with the concomitant drawback that any cylinder failure shuts off the flow from the entire associated gang.

One important aspect of the present invention is the size of the array of flotation devices and pumps, such as the array 29 in FIG. 6, in relation to the average wave length of the surface waves in the locale of the installation. If the smaller dimension of the length or width of the array less than one surface wave length, as depicted in FIG. 3, one wave crest impinging on a portion of the structure will create buoyancy at a portion of the array, while the preceding trough will create negative buoyancy at the remainder of the array. Thus the net buoyant force vector of the floats will shift rapidly with respect to the center of gravity of the array, and the entire structure will pitch and roll substantially in the water. However, if the structure is dimensioned so that the smaller of the length or width dimension is substantially greater than one wavelength, as shown in FIG. 4, several wave crests will mitigate their singular effects, the buoyant force vector will be much more constant, and the structure will be significantly more stable. Therefore an important feature of the invention is that the array is sized to be greater in all lateral dimensions that at least one wavelength of the average surface wave in the location of installation. This factor may vary according to local surface conditions. In the preferred embodiment the minimum dimension is two wavelengths, with at least three floats in a row in all directions.

It should also be noted that as a wave crest passes through the structure of the present invention, the floats encountered by the wave crest remove energy therefrom. As a result, the wave crest is gradually diminished at it passes through, and is generally attenuated, as shown in FIG. 5. Thus it is possible to employ the present invention not only to extract energy from surface waves, but also to attenuate wave energy before the waves strike an installation or fragile shoreline area. For example, as shown in FIG. 6, a plurality of structures 29, as described previously, may be anchored offshore of a beach area 65, and arrayed in linear fashion to form a breakwater 66. The structures 29 will attenuate the destructive energy of the surface waves before they strike the shore, and will also generate substantial power from the wave energy. This is a synergistic relationship not found in the prior art.

It may be appreciated that it may be desirable to protect the wave energy conversion structure of the present invention from severe wave action and winds, such as accompany storms at sea. One means of protecting the invention includes the provision of winching means 10 associated with the anchor lines 12 (FIG. 1), to pull the structure below the water level a sufficient distance to prevent wave impact on the structure. Although this action would temporarily interrupt power generation from the invention. It would save significant costs in maintenance and repair of the structure.

I claim:

1. An apparatus for capturing a portion of the wave energy on the surface of a body of water and converting the captured energy to a usable form of power, including a plurality of energy conversion devices, each adapted to convert reciprocal translational motion into another form of usable mechanical energy, structural frame means extending laterally in the water and adapted to secure said energy conversion devices, a large array of flotation devices, each connected to one of said plurality of energy conversion devices, all of said flotation devices together exerting a net buoyant effect on said frame means to support said frame means at the surface of the body of water and each of said flotation devices adapted to interact with the surface waves to impart reciprocal translation motion to said energy conversion devices, means for storing the energy output of said energy conversion devices, means for connecting the power output of said energy conversion devices to an end user, said flotation devices including a plurality of floats, and further including means for tethering portions of said floats to said structural frame means.

2. An apparatus for capturing a portion of the wave energy on the surface of a body of water and converting the captured energy to a usable form of power, comprising a generally rigid frame structure extending laterally in the body of water, a plurality of energy conversion devices secured to said frame structure, a plurality of floats, each joined to one of said energy conversion devices and adapted to operate the respective energy conversion device, each of said floats being disposed generally concentrically about the respective energy conversion device, said frame structure, said energy conversion devices, and said floats comprising a conjoint assembly, said plurality of floats having an aggregate net buoyancy, said energy conversion devices and said conjoint assembly being immersed in and supported at the surface of the body of water solely by said aggregate net buoyancy of said floats.

3. An apparatus for capturing a portion of the wave energy on the surface of a body of water and converting the captured energy to a usable form of power, comprising a generally rigid frame structure extending laterally at the surface of the body of water; a plurality of energy conversion devices secured to said frame structure, each including a hollow tubular shaft having a fluid flow channel extending therethrough, a piston fixedly secured about said tubular shaft, a cylinder slidably secured about said piston and shaft, said cylinder and said shaft defining a pair of closed annular chambers therebetween and separated by said piston, float means for driving said cylinder in reciprocal motion along said shaft to mutually expand and contract the volumes of said closed annular chambers, port means providing fluid flow communication between said fluid flow channel and said closed annular chambers to provide fluid to an expanding annular chamber and to vent fluid from a contracting annular chamber, and check valve means for directing unidirectional fluid flow through said fluid flow channel in response to fluid displacement from said closed annular chambers.

4. An apparatus for capturing a portion of the wave energy on the surface of a body of water and converting the captured energy to a usable form of power, comprising a generally rigid frame structure extending laterally in the body of water, a plurality of energy conversion devices secured to said frame structure, a plurality of floats; means for securing said floats to said frame structure in an array disposed in a nominal plane, said floats adapted to reciprocate generally transverse to the surface of the water, each of said floats joined to one of said energy conversion devices in generally concentric relationship and adapted to operate the respective energy conversion device; said frame structure, energy conversion devices, and floats comprising a conjoint assembly; and said plurality of floats having a net aggregate buoyancy sufficient to buoyantly support said conjoint assembly and maintain said nominal plane of said float array and said energy conversion devices generally collateral with the surface of the body of water.

5. The apparatus of claim 4, wherein said large array has a minimum horizontal dimension equal to or greater than two average surface wavelengths on the body of water.

6. The device of claim 4, further including means for mooring said structural frame means to the seabed in freely floating fashion.

7. The device of claim 6, further including a plurality of said structural frame means disposed in adjacent fashion and moored adjacent to a predetermined location to form a breakwater with respect to said predetermined location.

8. The device of claim 6, further including winching means joined to said mooring means to selectively draw said structural frame means below the surface of the body of water during destructive sea conditions.

9. The apparatus of claim 4, wherein said structural frame means includes an upper and a lower structural tier, and said energy conversion devices are disposed between said tiers and secured thereto.

10. The apparatus of claim 9, wherein said energy conversion devices include a plurality of piston fluid pumps, each having a piston rod extending upwardly therefrom and joined to one of said flotation devices.

11. The device of claim 10, wherein said piston pump includes a piston having a check value assembly integrally formed therewith.

12. The apparatus of claim 9, wherein said energy conversion devices include a plurality of fluid pumps, each including a hollow tubular shaft secured fixedly between said upper and lower tiers, and said flotation devices include a plurality of floats, each secured concentrically about one of said shafts and adapted to translate axially thereabout.

13. The apparatus of claim 12, further including a plurality of cylinders, each secured about one of said shafts and joined to a respective one of said floats, and a plurality of pistons, each fixedly secured to a medial portion of one of shafts to define therewith upper and lower chambers in each of said cylinders.

14. The apparatus of claim 13, further including port means extending from each of said shafts to the respective upper and lower cylinder chambers to permit fluid flow between said chambers and said shaft, and check valve means to direct unidirectional fluid flow through said shaft.

15. The apparatus of claim 14, wherein the opposed ends of said shafts are coupled to low pressure input header means and high pressure output header means.

16. The apparatus of claim 15, further including means for selectively joining or removing each of said shafts from said headers without disrupting the operation of the remainder of the assemblies of said shafts, cylinders, and floats.

* * * * *